Nov. 8, 1938.　　　　　L. L. GODWIN　　　　2,136,129
AGRICULTURAL IMPLEMENT
Filed Jan. 20, 1938　　　3 Sheets-Sheet 1
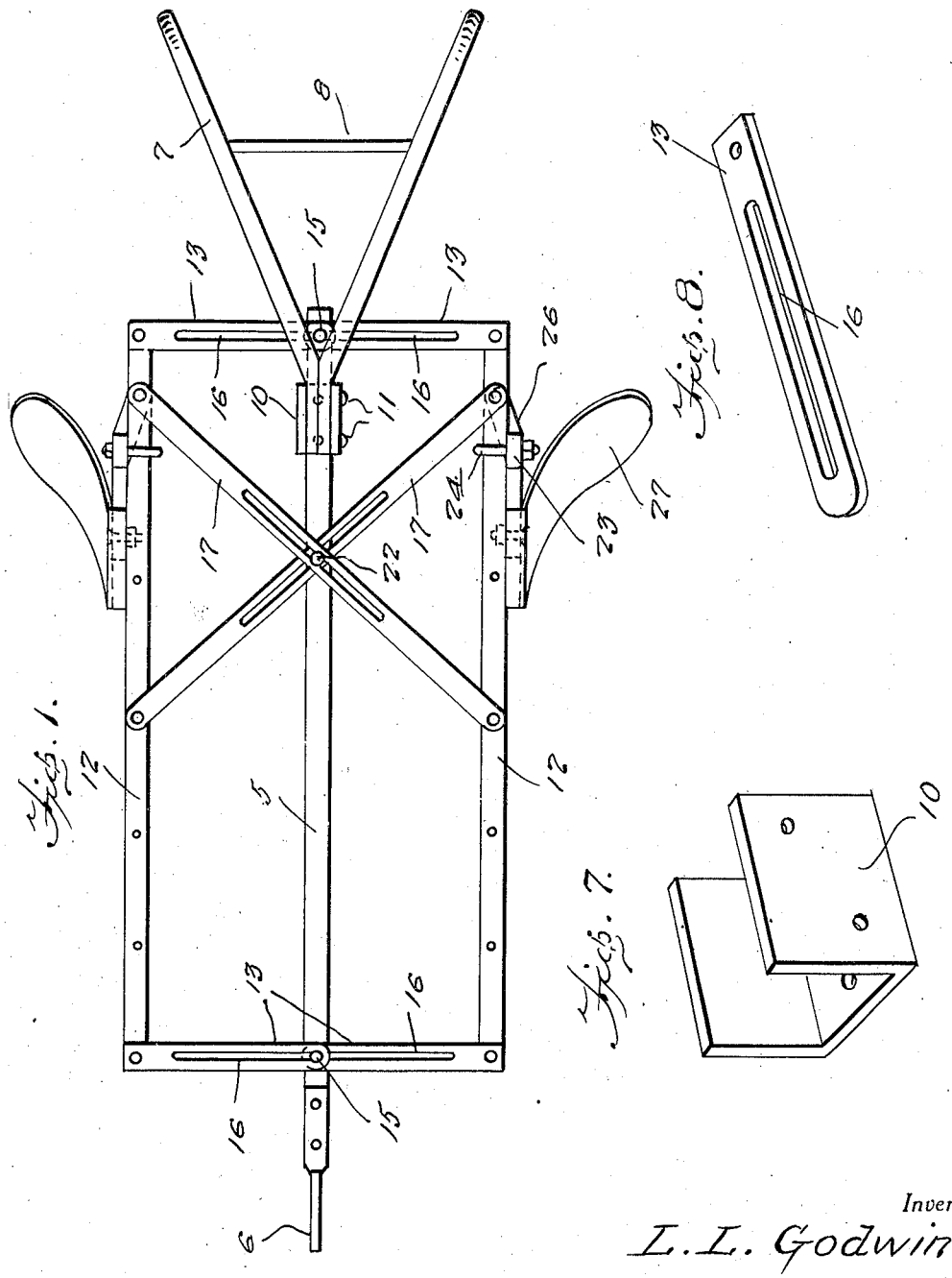
Inventor
L. L. Godwin
By Clarence A. O'Brien
Hyman Berman
Attorneys

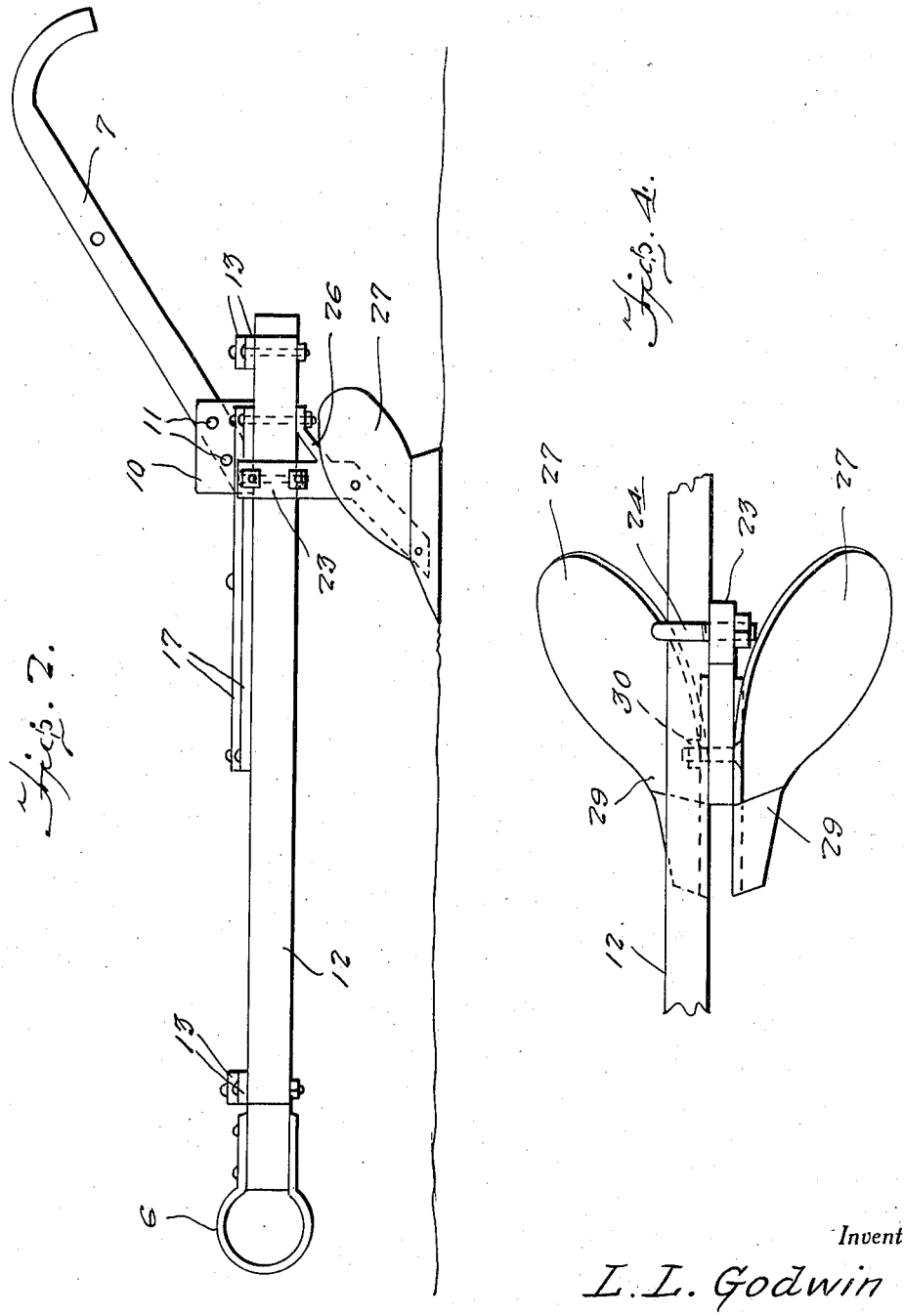

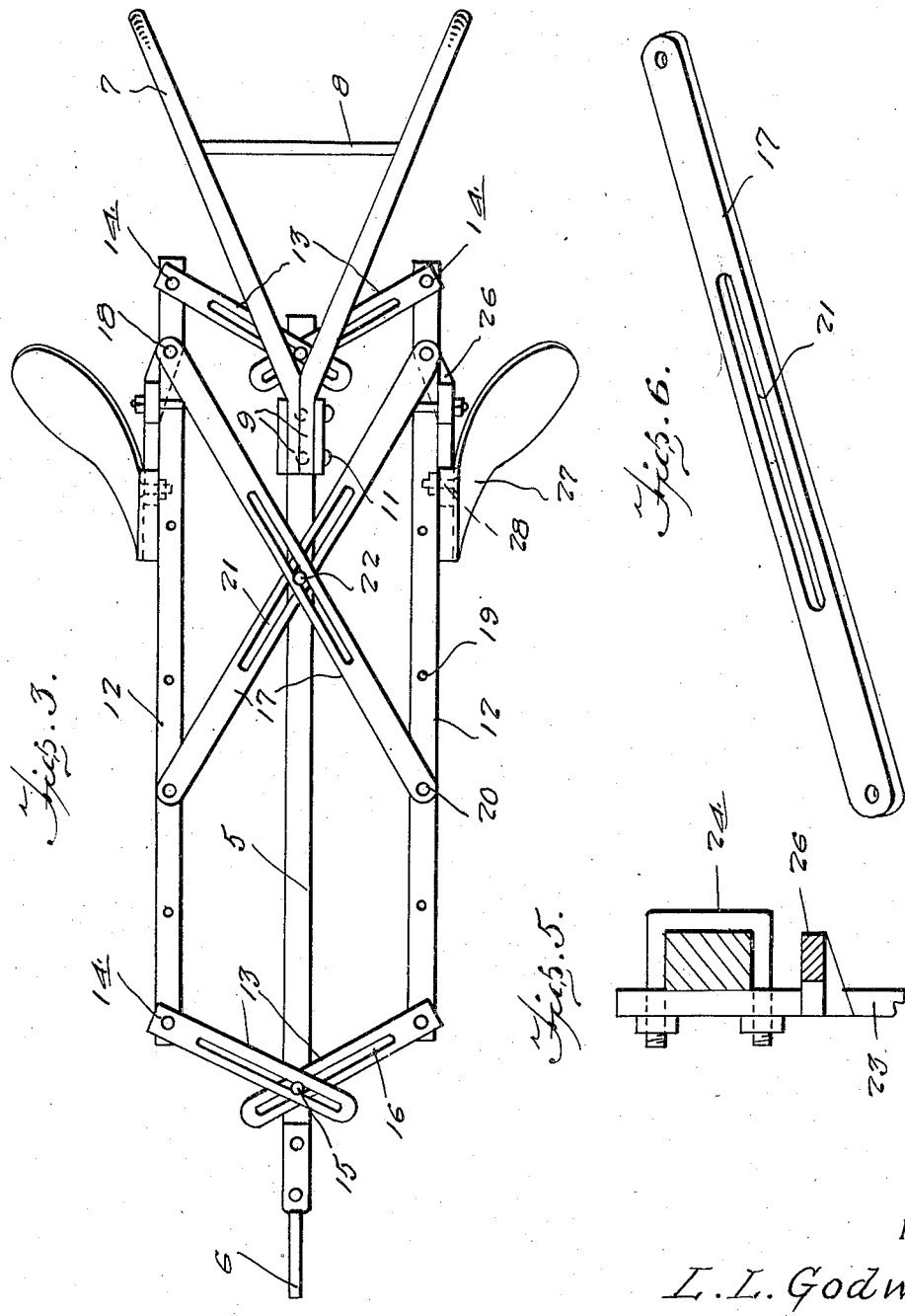

Patented Nov. 8, 1938

2,136,129

UNITED STATES PATENT OFFICE 2,136,129

AGRICULTURAL IMPLEMENT

Luther L. Godwin, Meridian, Miss.

Application January 20, 1938, Serial No. 186,002

1 Claim. (Cl. 97—172)

This invention relates to agricultural implements and an object of the invention is to provide an agricultural implement embodying a construction whereby earth-working tools mounted thereon may be positioned at the desired position of adjustment laterally relative to one another; and the invention together with its objects and advantages will be best understood from a study of the following description taken in connection with the accompanying drawings wherein:—

Figure 1 is a top plan view of the implement in one position of adjustment,

Figure 2 is a side elevational view of the implement,

Figure 3 is a top plan view of the implement in a second position of adjustment, Figure 4 is a fragmentary top plan view illustrating the manner of mounting a pair of earth-working tools, or implements to be used as a middle-buster, Figure 5 is a fragmentary detail sectional view showing the manner of securing a tool shank on one of the tool-carrying beams forming part of the implement structure, Figure 6 is a perspective view of one of the crossed bars, Figure 7 is a perspective view of a bracket member hereinafter more fully referred to, and Figure 8 is a perspective view of a link member.

Referring to the drawings by reference numerals it will be seen that the agricultural implement comprises a middle or center beam 5 provided at one end as at 6 for connection to suitable draft means. Extending from the beam 5 adjacent the rear thereof are divergent handles 7. Handles 7 are braced relative to one another by cross brace 8 and at their converging ends the handle members 7 terminate in parallel extensions 9 that fit within a channel bracket 10 bolted or otherwise secured to the top side of the beam 5 adjacent the rear end of the latter. The end extensions 9 of the handles 7 are secured within the channel of the bracket 10 through the medium of bolts or other suitable fastening elements 11.

Disposed at opposite sides of the center beam 5 are tool-carrying beams 12. The beams 12 are connected at the ends thereof to the beam 5 through the medium of pairs of links 13. The links 13 at one end thereof are pivoted to the beams 12 as at 14.

The links 13 of each pair overlap as shown and are connected to the beam 5 through the medium of pins 15 that extend through elongated slots 16 provided in the links 13 as shown.

For securing the beams 12 at the desired position of lateral adjustment relative to the beam 5, and to each other, there is provided a pair of cross members 17 which at one end are pivoted to the beams 12 adjacent the rear ends of the beams 12 through the medium of pivot bolts 18.

The free ends of the cross members 17 are provided with apertures adapted to align with selective openings 19 provided in the beams 12, and through the medium of said openings and pins 20 to be secured to the beams 12 in a manner to secure the beams at the desired position of lateral adjustment.

Intermediate their ends the crossed members 17 are provided with elongated slots 21 that accommodate a pin 22 extending upwardly from the beam 5.

It will thus be seen that beams 12 may be readily moved laterally inwardly or outwardly relative to one another and to the beam 5 and secured at the desired position of lateral adjustment.

Each of the beams 12 has detachably secured thereto a tool shank 23 through the medium of a U-bolt as shown in Figure 5.

Each shank 23 also has a brace member 26 extending therefrom and secured at its free end to the underside of a beam 12 through the medium of a pivot bolt 18. (See Figure 2.)

Each tool shank 23 is adapted to have secured to the lower end thereof an earth-working tool, such as for example a single plow 27 bolted thereto as at 28 and as shown in Figures 1 and 3, or a pair of earth-working elements 29 disposed at opposite sides of the shank at the lower end of the latter and secured to the shank by bolt and nut means 30 as shown in Figure 4. Where two earth-working tools such as shown at 29 in Figure 4 are used the agricultural implements will be found particularly useful as a middle-buster.

In Figure 1 the beams 12 are shown disposed at their maximum outward position of lateral adjustment, while in Figure 3 the beams 12 are shown at an intermediate position of lateral adjustment.

It is thought that a clear understanding of the construction, utility and operation of an agricultural implement of this character will be had without a more detailed description.

Having thus described the invention what is claimed as new is:—

An agricultural implement comprising a main beam, handles secured on the beam, tool beams arranged at opposite sides of the main beam, ground tools mounted on the tool beams, pairs of links pivoted on the ends of the tool beams and the links of each pair of links overlapping each other over the main beam and having matching slots, fasteners extending through the slots and main beam whereby said links may be slid and pivoted on the main beam, said tool beams having spaced openings arranged in opposite pairs, cross members having matched slots disposed over the main beam, a pin extending through the slots of said members and into the main beam for pivotally and slidably connecting said members on the main beam, pivots connecting certain ends of the members to the tool beams, and pins connected to the other ends of the members for insertion into selected pairs of openings for the adjustment of the tool beams towards and from the main beam, said tool beams being braced to each other by said cross members to relieve strain on the main beam from either of the tool beams and said tool beams being held in parallelism with each other by said cross members in all of their adjusted positions with respect to the main beam.

LUTHER L. GODWIN.